United States Patent [19]

Gibson

[11] E Patent Number: Re. 32,921

[45] **Reissued Date of Patent: * May 9, 1989**

[54] METHOD OF POWDER COATING THE INSIDE OF PIPES WITH A CONTINUOUS FILM OF PLASTIC MATERIAL

[75] Inventor: Jack E. Gibson, Odessa, Tex.

[73] Assignee: GCB, Inc., Odessa, Tex.

[ * ] Notice: The portion of the term of this patent subsequent to May 16, 1995 has been disclaimed.

[21] Appl. No.: 335,162

[22] Filed: Dec. 28, 1981

Related U.S. Patent Documents

Reissue of:

[64] Patent No.: 4,243,699
Issued: Jan. 6, 1981
Appl. No.: 862,261
Filed: Dec. 20, 1977

U.S. Applications:

[63] Continuation-in-part of Ser. No. 704,965, Jul. 13, 1976, Pat. No. 4,089,998.

[51] Int. Cl.[4] ..... B05D 1/12; B05D 3/02

[52] U.S. Cl. ..... 427/183; 118/308; 118/312; 118/408; 118/DIG. 5; 427/181; 427/182; 427/195; 427/184; 427/233; 427/236; 427/238; 427/239

[56] References Cited

U.S. PATENT DOCUMENTS

| | | | |
|---|---|---|---|
| 1,791,624 | 2/1931 | Jessup . | |
| 1,997,761 | 4/1935 | Bailey et al. | 219/47 |
| 2,626,011 | 1/1953 | Campbell | 188/58 |
| 2,734,782 | 2/1956 | Galle | 302/53 |
| 2,737,461 | 3/1956 | Heisler et al. | 117/18 |
| 2,880,109 | 3/1959 | Current et al. | 117/22 |
| 2,899,106 | 8/1959 | Weinert | 118/308 |
| 3,021,818 | 2/1962 | Limberger | 118/308 X |
| 3,063,860 | 11/1962 | Gemmer . | |
| 3,074,808 | 1/1963 | Harrison | 117/18 |
| 3,099,493 | 7/1963 | DeHart et al. | 302/29 |
| 3,099,497 | 7/1963 | Albert | 118/DIG. 5 |
| 3,108,022 | 10/1963 | Church | 118/58 |
| 3,199,923 | 9/1965 | Brooks | 302/29 |
| 3,207,618 | 9/1965 | De Hart | 427/182 |
| 3,208,869 | 9/1965 | Starr et al. | 117/18 |
| 3,218,184 | 11/1965 | Lemelson | 117/18 |
| 3,230,105 | 1/1966 | Spraul et al. | 117/18 |
| 3,245,824 | 4/1966 | Treat et al. | 117/18 |
| 3,260,611 | 7/1966 | Weidenhammer et al. | 117/18 |
| 3,304,012 | 2/1967 | Sem | 239/400 |
| 3,304,013 | 2/1967 | O'Brien | 239/468 |
| 3,333,739 | 8/1967 | Clearman et al. | 222/166 |
| 3,379,174 | 4/1968 | Vodicka | 118/318 |
| 3,416,492 | 12/1968 | Greenleaf | 118/308 |

(List continued on next page.)

FOREIGN PATENT DOCUMENTS

| | | | |
|---|---|---|---|
| 295268 | 10/1969 | Australia . | |
| 686283 | 5/1964 | Canada . | |
| 756565 | 4/1967 | Canada . | |
| 51-578 | 1/1976 | Japan . | |
| 999767 | 7/1965 | United Kingdom | 427/195 |

*Primary Examiner*—Shrive Beck
*Attorney, Agent, or Firm*—Richards, Harris, Medlock & Andrews

[57] ABSTRACT

A method of powder coating the inside of tubular goods, such as oil field pipe and the like, by connecting one end of the pipe to a means for producing a flow of compressible gases therethrough. The other end of the pipe is open to atmospheric pressure. A valve means is connected upstream of the pipe between the inlet end thereof and a container for holding a single charge of plastic powder. The charge of powdered plastic is isolated upstream of the pipe inlet. The charge is of sufficient size to coat the entire inside peripheral wall surface of the pipe with a substantial uniform coating of plastic. The pipe is heated above the softening temperature of the plastic and rotated so that when the valve is opened air flows through the pipe and establishes a pressure gradient across the entire length of the pipe to cause the captured charge of plastic to form a pocket of dispersed plastic particles which is forced through the pipe by the air flow, causing plastic particles to be deposited and fused to the hot rotating inner surface of the pipe.

12 Claims, 2 Drawing Sheets

U.S. PATENT DOCUMENTS

| | | | |
|---|---|---|---|
| 3,434,758 | 3/1969 | Fry | 118/308 |
| 3,484,266 | 12/1969 | Nelson | 117/18 |
| 3,488,206 | 1/1970 | Munder et al. | 117/18 |
| 3,532,531 | 10/1970 | Stallard | 427/195 |
| 3,554,164 | 1/1971 | West | 118/302 |
| 3,801,346 | 4/1974 | Melton et al. | 427/180 |
| 3,814,616 | 6/1974 | Kondo et al. | 117/17 |
| 3,869,300 | 3/1975 | Scheiber | 117/17 |
| 3,896,760 | 7/1975 | Duffy | 118/308 |
| 3,901,184 | 8/1975 | Payne et al. | 118/629 |
| 3,946,125 | 3/1976 | Scheiber | 427/195 |
| 3,974,306 | 8/1976 | Inamura et al. | 427/195 |
| 3,982,050 | 9/1976 | Kato et al. | 427/195 X |
| 3,995,771 | 12/1976 | Olivier | 222/61 |
| 4,018,185 | 4/1977 | Myers | 118/308 |
| 4,089,998 | 5/1978 | Gibson | 427/183 X |
| 4,090,666 | 5/1978 | Peck | 239/15 |
| 4,165,022 | 8/1979 | Bentley et al. | 222/76 |
| 4,256,241 | 3/1981 | Mesic | 222/85 |

METHOD OF POWDER COATING THE INSIDE OF PIPES WITH A CONTINUOUS FILM OF PLASTIC MATERIAL

Matter enclosed in heavy brackets [ ] appears in the original patent but forms no part of this reissue specification; matter printed in italics indicates the additions made by reissue.

CROSS REFERENCE TO RELATED APPLICATIONS

*This application is a reissue of Ser. No. 862,261, filed Dec. 29, 1977, now U.S. Pat. No. 4,243,699, which is a continuation-in-part of an earlier filed co-pending application entitled "Method of Powder Coating the Interior of Tubular Goods," Ser. No. 704,965, filed July 13, 1976, which issued as U.S. Pat. No. 4,089,998, May 16, 1978.*

BACKGROUND OF THE INVENTION

The difficulty of applying uniform plastic coatings to the interior of pipe and other tubular goods increases in proportion to the diameter and length of the pipe. Epoxy is one of the most satisfactory plastic coatings for oilfield pipe. An epoxy coating preferably is applied in powdered form to the heated, rotating pipe interior, where the plastic is fused into a continuous film and thereafter the pipe is cooled as the film solidifies to provide a superior coating which protects the metal pipe surface from chemically reacting with the material flowing therethrough, thereby elongating the life of the pipe.

In my co-pending patent application Ser. No. 704,965, filed July 13, 1976, now U.S. Pat. No. 4,089,998 issued May 16, 1978, there is taught a novel process by which pipe is coated in the above manner. The present patent application provides improvements over this previous process. As pointed out therein, the inside peripheral wall surface of a heated pipe can be coated in a superior manner by passing a pocket comprised of a dense, fluidized bed of plastic through the interior of a heated, rotating pipe so that the hot interior surface of the pipe is contacted by the plastic particles, whereupon the particles fuse to the inside wall of the pipe, thereby causing a uniform, continuous plastic coating to be achieved which was superior to other coatings known at that time. Following this discovery, Applicant has found other useful and novel processes by which the pocket of dispersed plastic particles can be transferred into and forced through the pipe in order to achieve an unexpected coating advantage. This new discovery is especially beneficial in coating large diameter pipe of considerable length, and this new process is the subject of this patent application.

SUMMARY OF THE INVENTION

A method of powder coating the inside surface of a pipe with a uniform continuous coating of plastic. The pipe is heated above the softening temperature of the plastic particles and rotated about its longitudinal axis. In one embodiment of the invention, a valve means connects one end of the pipe to be coated to a source of compressed gas while the other end of the pipe is left open to atmospheric pressure. A pocket of plastic is isolated upstream of the pipe inlet and downstream of the valve. The quantity of plastic contained within the pocket is about ten percent greater than the weight of the coating to be formed. The heated pipe is rotated about the longitudinal axial centerline thereof and the valve means is opened, whereupon, as the pocket of plastic is forced to move through the entire length of the pipe, the particles thereof progressively contact and deposit upon the inner pipe surface where they are fused into a continuous plastic film.

As the entire pocket of powdered plastic is blown from the upstream isolated location, through the heated spinning pipe, and, as the pocket of plastic particles flows from the inlet to the outlet end of the pipe, most of the particles contained within the pocket contact the pipe wall and fuse into a uniform continuous film of plastic, with a small excess of the powdered plastic exiting from the pipe outlet.

More specifically, a quantity of powdered plastic is placed within a chamber between two series-connected valve means, with the upstream valve leading to the compressed gas source and the downstream valve leading to the inlet end of the pipe. The two valves are simultaneously opened, thereby entraining or fluidizing the isolated quantity of plastic powder which is forced to flow as a fluidized pocket of a finite length into and through the heated pipe, where the particles contact and fuse to the rotating heated inner pipe surface.

In another embodiment of this invention, the mass flow through the heated rotating pipe is augmented by the placement of an air inlet upstream of the inlet end of the pipe and downstream of the isolated but dormant charge of plastic. This augmented air supply initially establishes a mass flow through the pipe so that when the blow air behind the pocket is established, there is no inertia of the system which must be overcome, and accordingly, improved flow characteristics of the system are realized.

In still another embodiment of the present invention, the inlet end of the apparatus containing the dormant charge of plastic is left opened to atmosphere while suction is applied to the outlet end of the pipe. The suction provides the only means by which the pocket of fluidized plastic particles, is formed and transferred through the hot rotating pipe.

A primary object of this invention is the provision of a method of coating the interior of a pipe with a continuous uniform film of plastic by placing a quantity of *the* powdered plastic upstream of the heated pipe and flowing the powder through the pipe so that most of the powdered plastic contained within the pocket contacts the heated pipe wall and fuses into a uniform coating.

Another object of this invention is to plastic coat the interior of tubular objects by isolating a quantity of plastic particles upstream of a heated pipe and force the charge through the pipe by applying air pressure upstream of the charge while the outlet end of the pipe is open to atmospheric pressure.

Still another object of this invention is the provision of a process for internally coating pipe with a continuous film of plastic by forming a dormant charge of plastic particles upstream of a heated pipe and thereafter forcing the charge to flow through the pipe so that most of the particles contained within the charge contact the hot pipe wall while the charge is in the act of flowing through the pipe, thereby fusing the particles into a continuous film which is substantially uniform along the entire length of the pipe.

Another and still further object of this invention is a method of powder coating the inside of a pipe by forming a fluidized pocket of plastic particles upstream of a heated pipe and flowing the pocket through the pipe under positive pressure and rotating the pipe as the particles contact and fuse to the pipe wall, so that a continuous plastic film extends for substantially the entire length of the pipe.

Still another object of this invention is the provision of a method of coating the inside peripheral wall surface of a pipe by forming an isolated charge of plastic upstream of the pipe inlet, applying a suction at the outlet end of the pipe, thereby forcing the pocket of plastic to be entrained into a pocket which is a dense fluidized bed of finite length. As the formed pocket of plastic particles flows through the pipe, the individual particles thereof progressively contact the pipe wall and fuse into a continuous uniform layer which coats substantially the entire length of the pipe. Most of the plastic which forms the pocket is fused into a coating as the pocket is forced through the entire length of the pipe.

These and various other objects and advantages of the invention will become readily apparent to those skilled in the art upon reading the following detailed description and claims and by referring to the accompanying drawings.

The above objects are attained in accordance with the present invention by the provision of a method for use with apparatus fabricated in a manner substantially as described in the above abstract and summary.

DETAILED DESCRIPTION OF THE PREFERRED EMBODIMENTS

Figure 1:
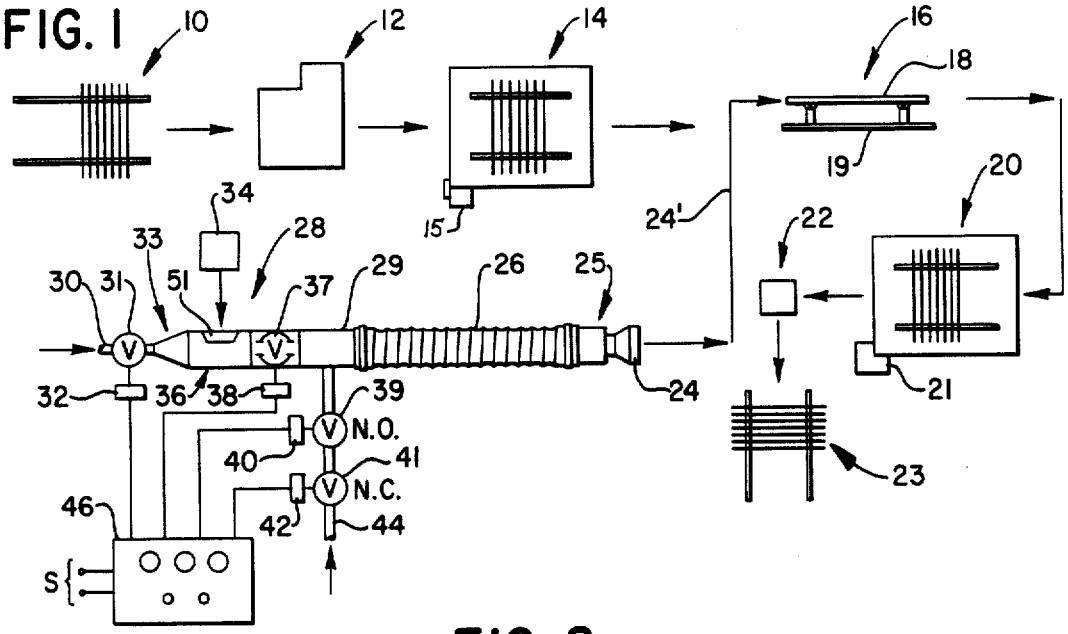
FIG. 1 is a schematical representation of process and equipment according to the present invention.

In the embodiment of the invention disclosed in FIG. 1, a pipe rack 10 successively supplies pipe 18 to a cleaning apparatus 12, such as, for example, sand blasting or shot peening using prior art equipment. The clean pipe is next heated in an oven 14 by means of a burner device 15, whereupon the heated pipe proceeds to station 16 where it is plastic coated according to this invention.

The station 16 includes a pipe spinning apparatus 19 which spins the pipe about its longitudinal axial centerline at a rotational speed of about 100 to 150 rpm as a charge of powdered plastic is forced therethrough. The exact rotational velocity varies with the diameter of the pipe which must spin at a speed which enables the deposited plastic particles to contact the pipe wall and thereafter spread out into a smooth, uniform film as it hardens or solidifies due to atmospheric cooling of the coating.

The coated pipe is next transferred into an oven 20 which is heated by a burner means 21. The soaking or subsequent heating station 20 is sometimes omitted, depending upon the chemical characteristics of the plastic powder. The coated pipe is inspected at station 22 and racked at 23.

Figure 2:
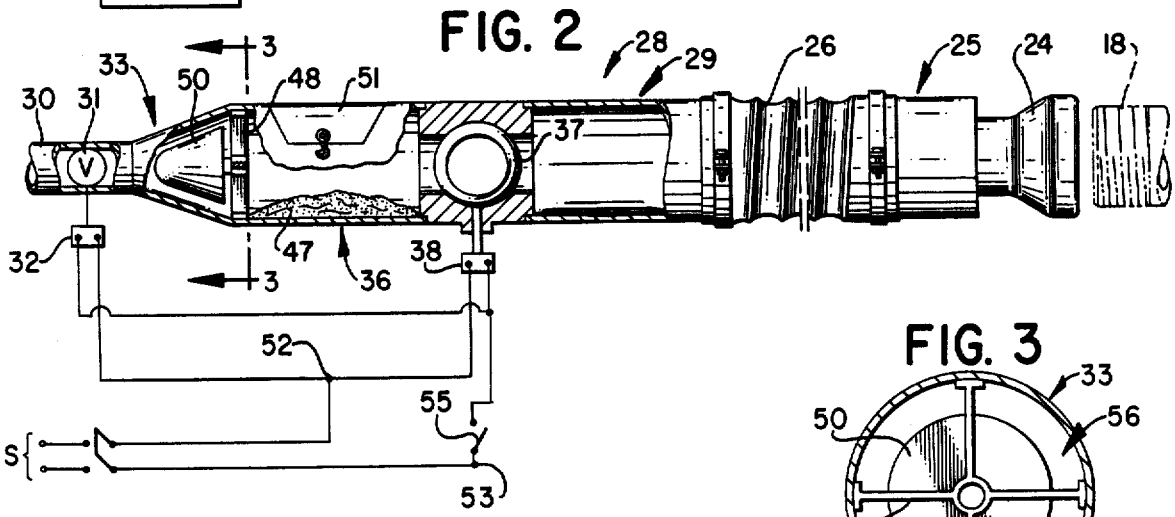
FIG. 2 is an enlarged, fragmented, part cross-sectional view of part of the apparatus seen disclosed in FIG. 1.
Figure 4:
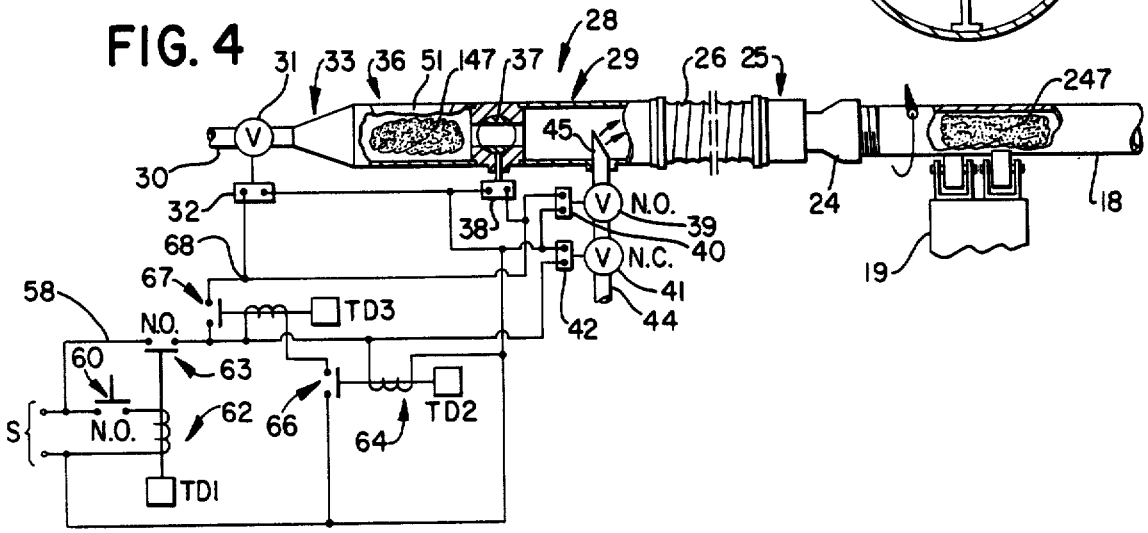
FIG. 4 is similar to FIG. 2 and discloses another embodiment thereof.

Adapter device 25 of FIGS. 1, 2, and 4 has a pipe receiving end 24 which is removably attachable to the inlet end of the spinning pipe as suggested by line 24', the details of which are more specifically disclosed in my co-pending patent application Ser. No. 704,965, filed July 13, 1976, now U.S. Pat. No. 4,089,998 issued May 16, 1978. Flexible hose 26 connects the adapter to, and forms part of, the pocket forming apparatus 28. The pocket forming apparatus includes a longitudinally disposed housing 29 having an axial passageway formed therethrough which is divided into a plurality of chambers. Pipe 30 leads to a source of compressible fluid, preferably air, and includes N.C. (i.e., normally closed) valve device 31 which rapidly opens and closes in response to energization of solenoid 32. The inlet pipe diverges at 33 into an enlarged, charge-containing enclosure 36 of sufficient size to contain a single charge. Hopper 34 contains an ample supply of powdered plastic material of a composition which is suitable for use in conjunction with this invention, such as exemplified by the following products and referred to in the claims as a synthetic, resin material:

(1) Corvel Polymer ECA-1446 TAN 2818 epoxy;

(2) Corvel Polymer ECA-1456 TAN 2862 epoxy-plenolic;

(3) M & T 8500 CO12 TAN epoxy.

In the various figures of the drawings, the valve device 37 is spaced from valve device 31 and is moved from the N.C. to the open position by the action of a solenoid 38. N.0. and N.C. solenoid actuated valves 39 and 41, respectively, are actuated by solenoid devices 40 and 42, respectively. The valves are series connected respective to one another and control a flow of compressed fluid from supply pipe 44 into an air inlet tube 45.

Control box 46 of FIG. 1 is connected to each of the before mentioned, solenoid actuated valves and to a suitable source of electrical current S. The control box includes circuitry for accomplishing the manipulation of the valves in a sequence of events necessary for establishing the flow of air and plastic material through the pipe according to the invention.

In FIG. 2, an appropriate quantity of powdered plastic 47, hereinafter called synthetic, resin material, or a "pile" or a "charge", lies dormant within the powder chamber of the housing 36. Spider 48 supports a cone 50 axially within the main housing. Charge door 51 admits a charge 47 into the powder chamber. In order to assure a uniform coating, the charge is slightly greater in weight as compared to the actual amount of plastic required to coat the pipe.

One example of the circuitry 46, disclosed in FIG. 1, is shown in greater detail in FIGS. 2 and 4. As seen in FIG. 2, the circuitry includes current legs 52 and 53 which provide current flow to the solenoids 32 and 38 through the switch means seen at "S" and 55. According to FIG. 2, closure of the main switch at S energizes legs 52 and 53. Closure of switch 55 simultaneously opens valves 31 and 37 which establishes a mass flow through the pipe 18 and moves the charge 47 towards the pipe inlet with the charge becoming a moving pocket of powdered plastic as seen at 147 in FIG. 4. The flow of air continues uninterrupted through the pipe such that the pocket is pushed through the pipe interior under a positive pressure gradient. The moving pocket is shorter in length than the pipe. The flow of air through the heated, spinning pipe is continued until sufficient time has elapsed for the fused particles to somewhat cool and become a continuous, self-supporting plastic film which adheres to the interior wall of the pipe.

The switch 55 is next opened, another charge placed into the chamber, another prepared pipe substituted for the processed one at 16, and the before mentioned sequence of events are then repeated while the last processed pipe is transferred into the soaking oven for post-treatment as required.

Figure 5:
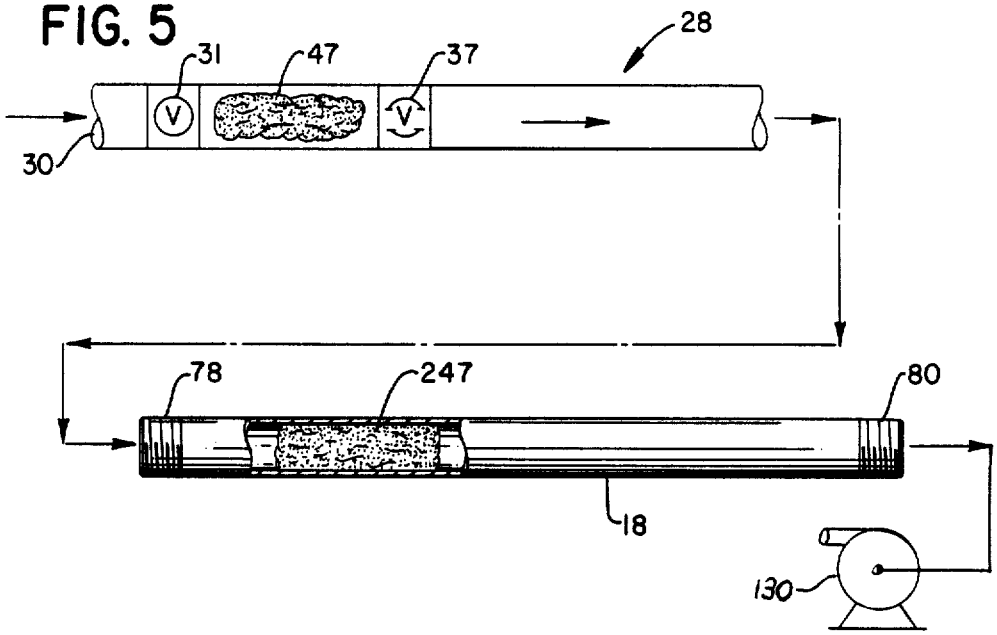
FIG. 5 is a schematical representation of another embodiment which discloses the process according to the present invention.

As seen in FIGS. 2 and 5, a pipe 18 can be suitably coated in the above described manner without the use of the primary blow air at 45; however, in such an instance, there must be a sufficient volume presented by the interior of the pocket-forming apparatus between the valve 37 and the pipe inlet 18 for the mass flow to properly accelerate before the pocket reaches the pipe inlet. This is achieved by eliminating the primary blow air as seen in FIG. 2, or by eliminating current flow to the solenoids 40 and 42 of the primary blow air valves so that the injection apparatus at 45 becomes dormant except for the turbulence caused by the outer marginal end portion thereof which is located within the chamber 29.

Figure 3:
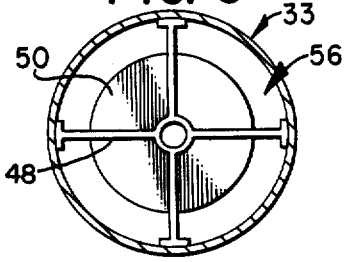
FIG. 3 is an enlarged, cross-sectional view taken along line 3—3 of FIG. 2.

In FIGS. 2 and 3, the annulus 56 formed between the cone and pocket-forming housing forces the air to flow in a pattern which enhances the charge of plastic at 47 to assume the form of a moving, concentrated pocket of material as it flows towards the adapter.

Looking in greater detail now to the embodiment of FIG. 4, it will be noted that conductors 58 and 59 are connected to the illustrated source of current "S". Contact 60, when manually closed, energizes a first time delay device 62 which closes contacts 63 thereof for a finite time interval equal to one cycle of operation. Closure of the contacts of TD1 energizes the solenoid 42 which moves the normally closed valve 41 to the open position, and simultaneously energizes the solenoid 64 of TD2. Closure of contacts 66 of TD2 is momentarily delayed for a time interval of less than one second in order for flow through 45 and into the heated, rotating pipe to reach equilibrium. Closure of contacts 66 energizes the solenoid of TD3, thereby closing the contacts 67 which remain closed until the TD3 solenoid is de-energized and thereafter times out.

Closure of contacts 67 simultaneously energizes solenoids 32, 38, and 40 to cause the valves 31 and 37 to move to the open position concurrently with the closure of valve 39 so that mass flow through the apparatus is uninterrupted.

It is necessary that the minimum time interval of either of TD3 and TD1 be set to a value which is sufficient to enable the charge 147 to be flowed through the rotating, heated pipe and for the flow of air to continue through the pipe until the pocket of plastic particles has deposited and fused into a continuous, uniform coating therewithin. The cycle of operation ends when TD1 and TD3 time out, thereby returning the valves 31, 37, 39, and 41 to their standby configuration.

The charge of plastic 47 in FIG. 2 is illustrated in FIG. 4 as having been fluidized as it commences to move as a pocket downstream at 147. The pocket at 247 is shown flowing through the heated, rotating pipe 18 while it coats the pipe wall in the manner of FIG. 6. In actual practice, of course, there is only one charge 47, which is changed into only one pocket 147 or 247 as the charge is forced to flow through the pipe.

FIG. 5 is a diagrammatical illustration of another embodiment of this invention. The pocket of plastic material 47 is seen isolated in chamber 36 by the employment of the before mentioned, two spaced valves 31 and 37 which are series connected respective to one another with the charge being located therebetween. The valves are connected in series with inlet 30 and pipe inlet 78. The inlet 30 is open to the atmosphere, while the outlet 80 is connected to suction-producing apparatus 130, which produces a mass flow through the entire apparatus when the valves 31 and 37 are opened. The charge of plastic becomes fluidized as illustrated at 47 to form the illustrated pocket of plastic 247. For purposes of illustration, the pocket is also shown within the pipe after it has moved from 47 into a marginal length of the pipe interior. As noted in various figures of the drawing, the pocket is not as long as the pipe.

Figure 6:
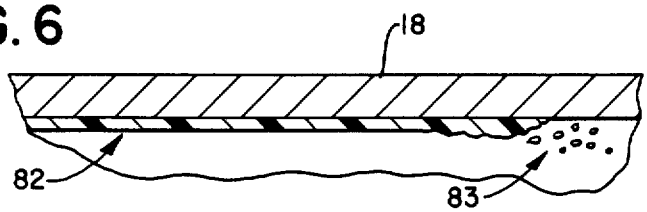
FIG. 6 is a fragmentary, enlarged, cross-sectional representation of a pipe which is in the act of being coated according to this invention; and, FIG. 7 is a fragmented, part cross-sectional representation of apparatus for use in conjunction with still another embodiment of this invention.

In FIG. 6, the pocket is in the act of flowing through the pipe 18. A coating at 82 has been fused thereon as schematically illustrated therein. As the pocket flows through the pipe, the plastic particles contained therewithin contact and fuse to the pipe wall as illustrated at 83. The purpose of FIG. 6 in conjunction with other figures of the drawing is to illustrate the inventor's concept of the process of the present invention.

Figure 7:
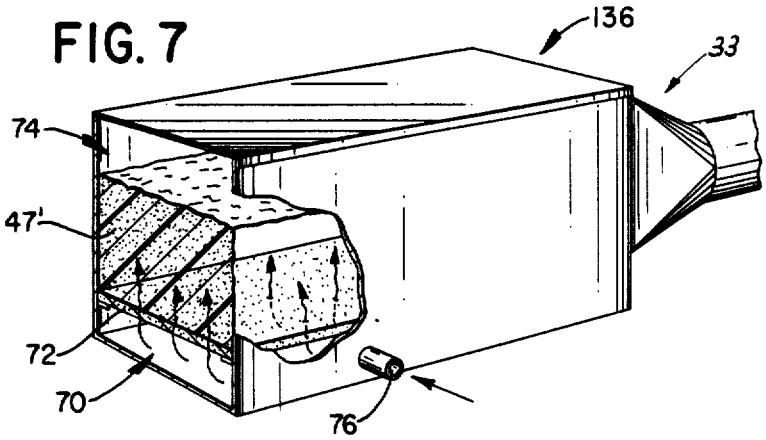

In FIG. 7, a plastic-containing enclosure 136 is included as part of the main housing 28 of FIG. 2 for providing a fluidized bed 47'. Porous baffle 72 divides the apparatus 136 into a lower air housing 70 and an upper fluidized bed section 74. Air inlet 76 emits a small controlled air flow into housing 70 to establish the fluidized bed. Provision must be made for a small egress of air from the upper end of 74 in order to maintain the fluidized bed while valves 31 and 37 are closed. This can be accomplished by any number of different expedients, including the provision of a small, looped tube which is connected from 74 into the downstream side of valve 37, or alternatively, a small aperture formed through the upper part of the valve seat element.

In operation of FIGS. 1 and 4, a quantity of powdered plastic is charged into the chamber 36. At this time, the valves 31 and 37 are closed, while the valve 39 is open. A source of air pressure is made available at supply inlets 30 and 44. The cleaned, preheated pipe 18 is received at 16 and rotated at a speed of about 100 rpm, depending upon the i.d. of the pipe. The adapter 24 is placed in attached relationship at the inlet end of the pipe 18 so that any subsequent flow of material from the pocket-forming apparatus will be forced to flow from the flexible hose, through the adapter, and into the pipe, with minimal leakage occurring between the adapter and the inlet end of the pipe in order to avoid waste of material. The outlet end of the pipe is left open to atmospheric pressure.

Primary air flow through tube 45 is initiated by opening the N.C. valve 41 and thereafter both valves 31 and 37 are opened while valve 39 is simultaneously closed. This action produces a continuous mass flow through the pipe during the coating process. During the continuous flow of material, the pocket moves through the pipe with no interruption of flow, and it is believed that this uninterrupted type of flow contributes to the success of the present process.

In the embodiment of FIG. 2, the primary air seen at 45 in FIGS. 1 and 4 has been eliminated. The outlet end of the pipe 18 is open to atmosphere. The charge of plastic is blown through the pipe 18 in the before described manner. The downstream valve 37 can be replaced with a baffle which forms a dam, if desired.

When it is necessary to coat long joints of pipe, the uniformity of the coating thickness can be improved by throttling the air flow so that the pocket enters the pipe at a relatively high velocity and exits the pipe at a relatively low velocity. This can be accomplished by the provision of a control means which varies the rate of flow through the pipe by manipulation of either of the valves 31 or 37. For example, solenoid 32 can fully open the valve 31 to provide a high pressure at 33 and, after the pocket has entered the pipe inlet, the valve can commence to close in proportion to the distance the pocket has traveled through the pipe. Hence, the rate of velocity of the traveling pocket of plastic through the pipe can be employed to enhance the uniformity of the coating thickness.

It has been found that an initial pressure of 19 psig effected at source 30 and progressively reduced to 13 psig as the pocket exits the pipe works to advantage where a difference in coating thickness is noted at each extremity of the processed pipe.

In FIG. 5, an appropriate charge is placed within the pocket-forming apparatus, with the valves 31 and 37 being closed so as to isolate the charge. Suction is applied at the outlet end 80 of the heated, rotating pipe, the valves 31 and 37 opened, whereupon the charge is forced to move through the pipe. Atmospheric pressure only is effected at 30 in FIG. 5.

Example I

| | | | |
|---|---|---|---|
| Pipe Size | 2⅜ I.D. | Type | J55 tubing. |
| Length | 31-33'. | Rotational speed | 135 rpm. |
| Preheat temperature | 375° F. | Ounces employed | 32. |
| Powder type | Corvel. | | |
| Air pressure at inlet 30 | 19 psi. | | |

Example II

| | | | |
|---|---|---|---|
| Pipe Size | 2⅜ I.D. | Type | J55 tubing. |
| Length | 31-33'. | Rotational speed | 135 rpm. |
| Preheat temperature | 375° F. | Ounces employed | 32.0 |
| Powder type | Corvel. | | |
| Air pressure at inlet 44 | 19 psi. | | |
| Air pressure at inlet 30 | 19 psi. | | |

I claim:

1. Method of powder coating the interior element with a synthetic plastic resin material comprising the steps of:

(1) preheating the element to a temperature in excess of the fusion temperature of a plastic resin powder;

(2) rotating the preheated element about its longitudinal axis at a speed which enables any subsequently fused plastic resin to spread into a continuous film;

(3) making a pocket-forming apparatus by providing a chamber with an inlet and an outlet; and, connecting one end of the element to the outlet of the pocket-forming apparatus while leaving the other end of the element unobstructed so that flow can occur therethrough;

(4) placing a *dormant* charge of plastic powder within said pocket-forming apparatus; said *dormant* charge being slightly in excess of the amount of plastic required to uniformly coat the entire interior of said tubular element in a single pass of the charge through the element;

(5) forming *from said dormant charge* a pocket of plastic powder which is smaller in volume than the interior of said element and forcing said pocket into the interior of said element by flowing a stream of compressible fluid through the inlet of said pocket-forming apparatus to simultaneously move the entire charge from the chamber into said element, thereby coating the interior of said preheated, rotating element in a single pass;

(6) said pocket, as it flows through the interior of said element, is limited to a length which is less than the length of said tubular element.

2. The method of claim 1 wherein step (5) is carried out by flowing compressed air into said pocket-forming apparatus while the outlet end of said element is open to atmospheric pressure.

[3. The method of claim 1 wherein step (5 ) is carried out by flowing compressed air into the pocket-forming apparatus while connecting the outlet end of the pipe to a suction device.]

4. The method of claim 1 wherein step (5) is carried out by isolating said charge downstream of a valve, connecting the upstream side of said valve to a source of pressure which is above atmospheric pressure, connecting the downstream end of said pocket-forming apparatus to the inlet of the element, connecting the outlet of the element to a source of atmospheric pressure, forming a moving pocket of plastic material by opening said valve whereupon a flow occurs through said pocket forming apparatus and said pocket is moved through said element as particles therefrom contact and fuse to the inner wall of the element.

5. The method of claim 4 wherein the flow rate through the element is diminished as the pocket flows from the inlet to the outlet of the element.

[6. The method of claim 1 wherein step (5) is carried out by isolating said charge downstream of a valve, connecting the upstream side of said valve to a source of pneumatic pressure, connecting the downstream end of said pocket-forming apparatus to the inlet of the element, connecting the outlet of the element to a source of pressure lower than atmospheric pressure, opening said valve to enable a flow to occur through said pocket-forming apparatus such that a moving pocket of plastic material flows through said element while particles of plastic therefrom contact and fuse to the pipe wall.]

[7. The method of claim 6 wherein the flow rate through the element is diminished as the pocket flows from the inlet to the outlet of the element.]

8. Method of powder coating the interior of a pipe with a synthetic plastic resin material comprising the steps of:

(1) preheating the pipe to a temperature in excess of the fusion temperature of a powdered plastic resin;

(2) rotating said preheated pipe about its longitudinal axis at a velocity which causes any subsequently fused plastic to spread out into a continuous film;

(3) connecting an inlet end of the pipe to one end of a flow conduit, while the other end of the pipe is left unrestricted respective to flow therethrough;

(4) placing a *dormant* charge of plastic powder upstream of the pipe inlet and within the flow conduit; said *dormant* charge being in excess of the quantity of plastic required to coat the interior of the pipe;

(5) applying pneumatic pressure to the other end of the flow conduit at a location upstream of said dormant charge to cause the entire *dormant* charge to assume the form of a fluidized pocket of plastic material having a volume which is less than the volume of the interior of the pipe; and (6) pushing the entire pocket from the flow conduit and into the preheated, rotating pipe, and limiting the length of the pocket to a value less than the length of the pipe; whereupon particles of powdered plastic progressively deposit onto the heated, inside surface of the pipe and fuse thereto as the pocket moves into the pipe inlet, through the pipe, and out the other end of the pipe.

9. The method of claim 8 and further including the [step] *steps* of isolating said charge of placing a valve within said conduit and locating said charge downstream of said valve, carrying out step (5) by opening said valve in order to admit flow to form the pocket and push the pocket through the pipe.

10. The method of claim 9 and further including the step of flowing primary air through said pipe prior to step (6), and discontinuing the flow of primary air simultaneously with the opening of said valve so that the application of pressure in step (5) does not have to overcome the inertia of any air contained within the pipe.

11. Method of powder coating the interior of a tubular element with a plastic resin comprising the steps of:

(1) selecting a synthetic resin material in particulate form which is capable of being bonded to the interior wall surface of the tubular element;

(2) preheating the tubular element to a temperature in excess of the fusion temperature of the resin material;

(3) rotating the preheated tubular element about its longitudinal axis at a speed which enables any subsequently fused resin material to spread into a continuous film;

(4) providing a chamber with an inlet and an outlet, and isolating a *dormant* charge of the resin material of step (1) within said chamber; said *dormant* charge being slightly in excess of the amount of plastic material required to uniformly coat the entire interior of said tubular element;

(5) communicating one end of the rotating, preheated tubular element with the outlet of said chamber, while leaving the other end of the tubular element unobstructed to flow therethrough;

(6) forming the *dormant* charge plastic resin material into a pocket which is smaller in volume than the interior of said element by forcing the entire isolated charge of step (4) into the interior of said tubular element by applying a stream of compressible fluid which flows through the inlet of said chamber and through said tubular element, thereby moving the pocket only one time through the tubular element in advance of said stream of compressible fluid so that the interior of said element is coated with the resin material in a single pass;

(7) said pocket, as it flows through the interior of said element is confined to a length which is less than the length of said tubular element.

12. Method of powder coating the interior of a pipe with a synthetic resin material comprising the steps of:

(1) preheating the pipe to a temperature in excess of the fusion temperature of the resin material;

(2) rotating the preheated pipe about the longitudinal axis thereof at a velocity which causes any subsequently fused resin material to spread out into a continuous film;

(3) providing a chamber with an inlet and an outlet; and, connecting one end of the rotating pipe to the outlet of the chamber;

(4) selecting a synthetic resin material in particulate form which is capable of being bonded to the interior wall surface of the tubular element;

(5) placing an isolated dormant charge of the resin material of step (4) within the chamber; said *dormant* charge being in excess of the quantity of resin material required to coat the entire interior of the pipe;

(6) applying pneumatic pressure to the inlet end of the chamber at a location upstream of said isolated *dormant* charge to cause the entire *dormant* charge to move from the chamber and to assume the form of a pocket of resin material wherein the pocket has a volume which is less than the volume of the interior of the pipe; and (7) pushing the entire pocket from the chamber outlet and into the preheated, rotating pipe such that the length of the pocket assumes a value less than the length of the pipe; whereupon particles of resin material progressively contact and fuse onto the heated, interior pipe surface during one movement of the pocket through the interior of the pipe.

13. The method of claim 12 wherein steps (5) and (6) are carried out by flowing compressed air into said chamber while the outlet end of said pipe is open to atmospheric pressure.

14. The method of claim 13 and further including the step of isolating said charge from a source of pneumatic pressure by a valve means;

carrying out steps (5) and (6) by opening said valve means to cause the pneumatic pressure to flow through the chamber and then through the preheated, rotating pipe; thereby moving the entire charge from the chamber such that the aforesaid pocket of resin material is formed.

*15. The method of claim 1 wherein step (5) is carried out by applying suction at the outlet end of said tubular element while the inlet end of said pocket forming apparatus is open to atmospheric pressure.*

* * * * *